United States Patent
Norton

[15] 3,663,035
[45] May 16, 1972

[54] SELF-CONTAINED PASSENGER RESTRAINING SYSTEM

[72] Inventor: Thomas W. Norton, Simsbury, Conn.

[73] Assignee: The Ensign-Bickford Company, Simsbury, Conn.

[22] Filed: Jan. 27, 1970

[21] Appl. No.: 6,111

[52] U.S. Cl. .................................280/150 AB, 102/39
[51] Int. Cl. .....................................................B60c 21/10
[58] Field of Search ..................280/150; 102/73, 78, 39, 70; 23/281

[56] References Cited

UNITED STATES PATENTS

| | | | |
|---|---|---|---|
| 2,779,281 | 1/1957 | Maurice et al. | 102/39 |
| 3,089,418 | 5/1963 | Stiefel | 102/39 |
| 3,552,769 | 1/1971 | Kemmerer et al. | 280/150 |
| 1,316,132 | 9/1919 | Baldwin | 102/78 |
| 3,532,360 | 10/1970 | Leising et al. | 280/150 |
| 2,995,088 | 8/1961 | Asplund | 102/70 |
| 3,089,419 | 5/1963 | Pollard | 102/39 |
| 3,450,414 | 6/1969 | Kobori | 280/150 |
| 3,532,359 | 10/1970 | Teague et al. | 280/150 |

*Primary Examiner*—Kenneth H. Betts
*Attorney*—Prutzman, Hayes, Kalb & Chilton

[57] ABSTRACT

An inflatable self-contained passenger restraining system independent of the electrical system of the vehicle is provided for restraining movement of an occupant upon rapid deceleration or impact of the vehicle. The system comprises an inflatable bag movable between a collapsed deflated position and an expanded deployed position, a pyrotechnic gas generator operatively associated with the bag for inflation thereof, the generator containing solid, granular, gas-generating charges in a multistage arrangement. An inertia sensing device responsive to impact force above about 4 g triggers an explosive signal transmission cord for actuating the pyrotechnic gas generation of the inflating gas.

11 Claims, 8 Drawing Figures

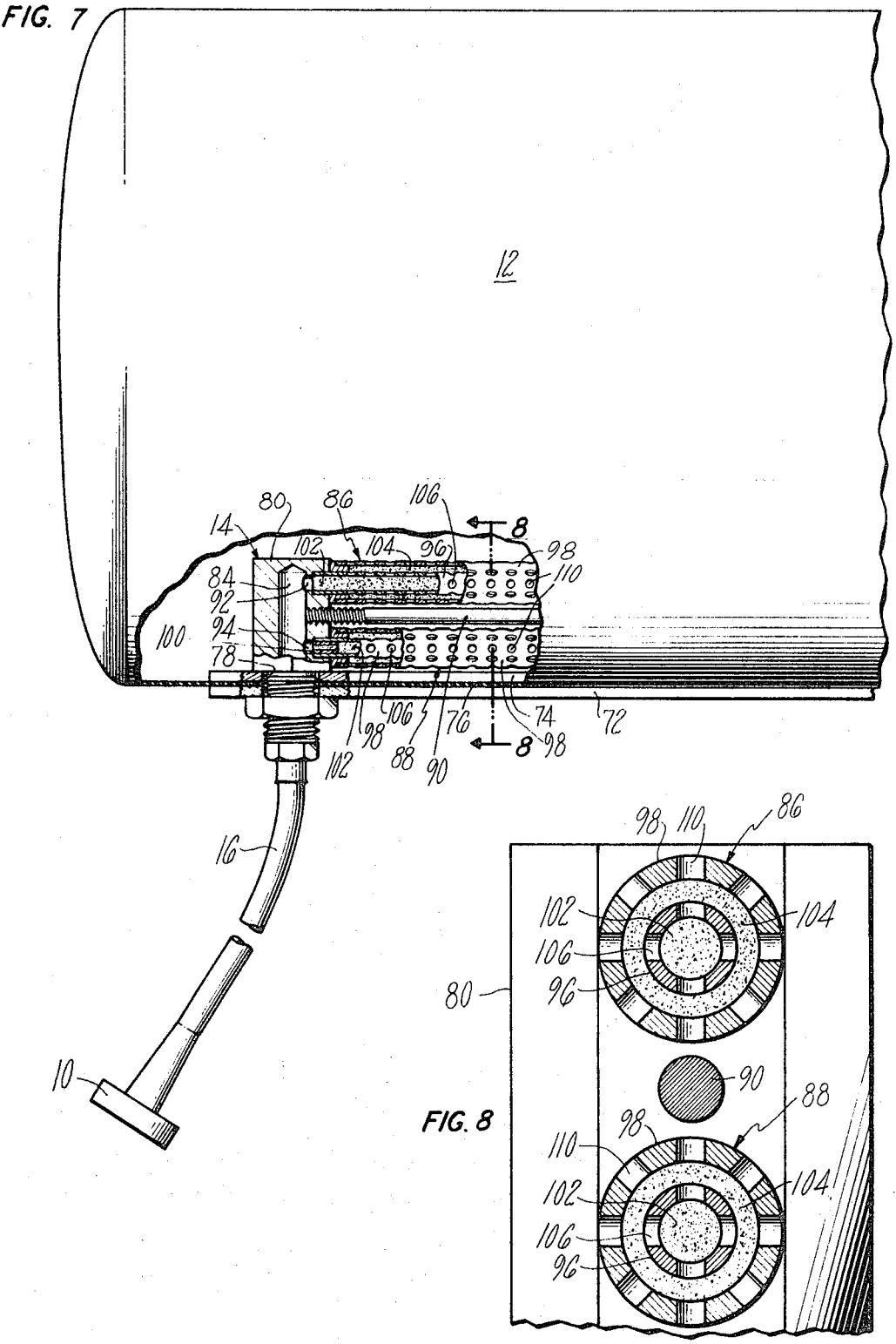

SELF-CONTAINED PASSENGER RESTRAINING SYSTEM

BACKGROUND AND SUMMARY OF THE INVENTION

The present invention relates generally to vehicle safety systems and is more particularly concerned with a new and improved system for protecting the occupants of a vehicle by restraining their movement upon rapid deceleration or impact of the vehicle.

In recent years increased emphasis has been placed on passive safety systems and devices for vehicles such as automobiles and the like. Such systems require no action by the occupant of the vehicle, in contrast to the frequently neglected seat belts, and are installed within the vehicle in a state or condition of operative readiness. Upon the occurrence of a sudden impact force such as that caused by a collision of the vehicle with a stationary or moving object, the system is automatically activated and deployed so that the occupant is cushioned against injury. Recently, interest has centered on passive systems of the inflatable restraining type which are sufficiently compact to be installed at numerous appropriate locations within the vehicle without taking up substantial space. Systems of this type generally take the form of headrest and frontal safety pillows or crash bags which can be quickly, controllably and automatically deployed in response to an impact force or collision condition. The pillows usually are inflated by a gas rapidly released from a storage cylinder or tank located within the pillow by a small explosive charge electrically connected to impact sensing devices mounted at appropriate locations throughout the vehicle. The impact sensitive devices generally take the form of switches which, when activated, suitably connect the electrical leads of the explosive charge to the electrical system of the vehicle to trigger the explosive and effect the desired release of the compressed gas.

However, it is generally preferred that safety systems of the type described be self-contained and completely independent of the vehicle's electrical system while at the same time providing extremely high reliability and rapid response to deceleration or impact conditions. Accordingly, it is a primary object of the present invention to provide a new and improved passive safety system of this type possessing the enumerated preferred characteristics.

Another object of the present invention is to provide a new and improved inflatable passenger-restraining system of the type described capable of full deployment into its operative restraining condition prior to movement of a passenger in response to a high impact force condition. Included in this object is the provision for a system capable of completing the deployment of an inflatable safety device in substantially less than 90 milliseconds.

Still another object of the present invention is to provide an inflatable restraining system of the type described incorporating confined, nonelectrical energy transfer and gas generating functions and having high reliability of operation coupled with versatility of application. Included in this object is the provision for a pyrotechnic and explosive energy signal transmission and gas generating system instantaneously responsive to the system's inertia sensing device for rapidly deploying one or more inflatable passenger-restraining devices.

A further object of the present invention is to provide a self-contained inflatable restraint system of the type described capable of not only explosively deploying a passenger confinement but also of sustaining the deployed condition of the confinement for periods substantially in excess of the time required for preventing uncontrolled movement by the occupants of the vehicle during a collision.

A still further object of the present invention is to provide a multistage gas generator for use in a system of the type described, the generator employing elongated pyrotechnic columns arranged in substantial parallelism for rapidly delivering gas to an inflatable crash bag.

Other objects will be in part obvious and in part pointed out more in detail hereinafter.

These and related objects are accomplished in accordance with the present invention by providing a self-contained vehicle safety system of the type described independent of the electrical system of the vehicle. The system is effective for restraining movement of an occupant upon rapid deceleration or impact of the vehicle and comprises an occupant-restraining member such as an inflatable bag movable between a collapsed or deflated position and an expanded deployed position immediately adjacent the occupant. The system further includes deployment means for the occupant-restraining member operatively associated therewith for moving the inflatable member out of its collapsed inoperative position toward its expanded deployed position, the deployment means preferably being a solid, granular, gas-generating explosive charge. Inertia sensing or monitoring devices responsive to a rapid deceleration force of at least about 4 g triggers a nonelectrical signal transmission means, such as a detonating cord, operatively connected to the gas generator for the pyrotechnic generation of the inflating gas.

A better understanding of the objects, advantages, features, properties and relationships of the invention will be obtained from the following detailed description and accompanying drawings which set forth illustrative embodiments and are indicative of the various ways in which the principle of the invention is employed.

BRIEF DESCRIPTION OF THE DRAWINGS

In the drawings:

FIG. 5 is a schematic side elevational view showing the passenger compartment of FIG. 1 and seat of FIG. 2, illustrating the system in its fully deployed condition;

FIG. 6 is an enlarged fragmented view, partially broken away and partially in section, of an explosive signal transmission line and related components used in the system of the present invention;

FIG. 7 is an enlarged fragmented view of an alternative headrest and gas generator arrangement within the system of the present invention, the headrest and generator being partially broken away for clarity and ease of description; and FIG. 8 is a sectional view taken along the line 8—8 of FIG. 7.

DESCRIPTION OF THE PREFERRED EMBODIMENTS

Figure 1:
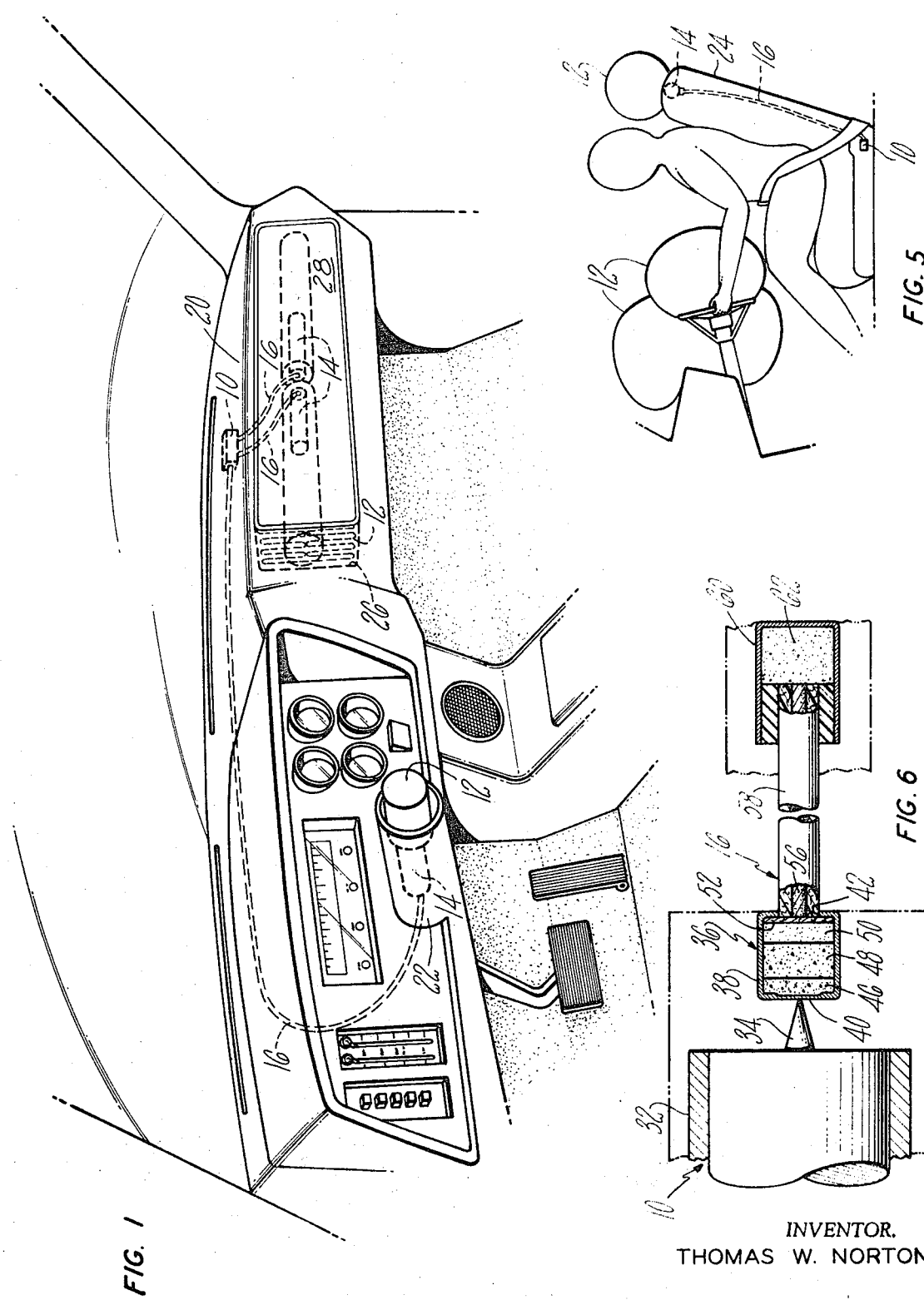
FIG. 1 is a perspective view of the front portion of an automobile passenger compartment illustrating typical installations of the inflatable restraining system of the present invention, the system being shown in its deflated condition.

The system of the present invention is preferably embodied within frontal and headrest inflatable safety devices for automobiles or similar vehicles. However, it will be appreciated that the system may be incorporated in other locations or in other vehicles where it is desired to provide a passive safety system for protecting the occupants, particularly where the vehicle is subject to rapid deceleration or impact conditions which might cause uncontrolled movement of the passengers thereby endangering their safety.

Referring now to the drawings in greater detail wherein like reference numerals indicate like parts throughout the several figures, the system is shown as broadly including an inertia or acceleration sensing device 10 securely mounted within a vehicle, an inflatable passenger confinement 12 suitably positioned for restraining the movement of the passenger when fully inflated, a pyrotechnic gas generator assembly 14 mounted adjacent the confinement and in communication therewith for delivering gas to the confinement upon activation and a nonelectrical signal transmission line 16 providing operative communication between the sensor 10 and the gas generator assembly 14.

In the embodiments selected for illustrative purposes, the passenger confinement 12 of the system is shown installed within the dashboard 20, steering column 22 or top of a passenger seat 24 of an automobile. Accordingly, the confinement or inflatable crash bag 12 assumes a shape most suited to the particular area of the passenger compartment where it is installed. For example, where the confinement is to be used as a headrest, it will generally take the form of an elongated cylindrical pillow. On the other hand, the driver confinement mounted in the steering column may be a circular cushion having a generally elliptical cross section and be of suitable size so as not to restrict the view of the driver when it is inflated. The passenger frontal restrainment may be a substantially larger member, taking the form of a mattress-like shield covering about one-half the total width of the passenger compartment for restraining the upper torso of the passenger.

The crash bag must be capable of absorbing the thrust of the passenger without rupturing while at the same time minimizing any rebound which might otherwise result from the occupant striking the confining cushion. Thus, the inflatable crash bag is generally made from thermoplastic or thermosetting polymeric material having a medium to high degree of plasticity coupled with controlled flexibility and modulus of elasticity. Although many different types of materials may be employed, crash bags made from a nylon-neoprene fabric-like material have exhibited repeatedly good results.

Figure 2:
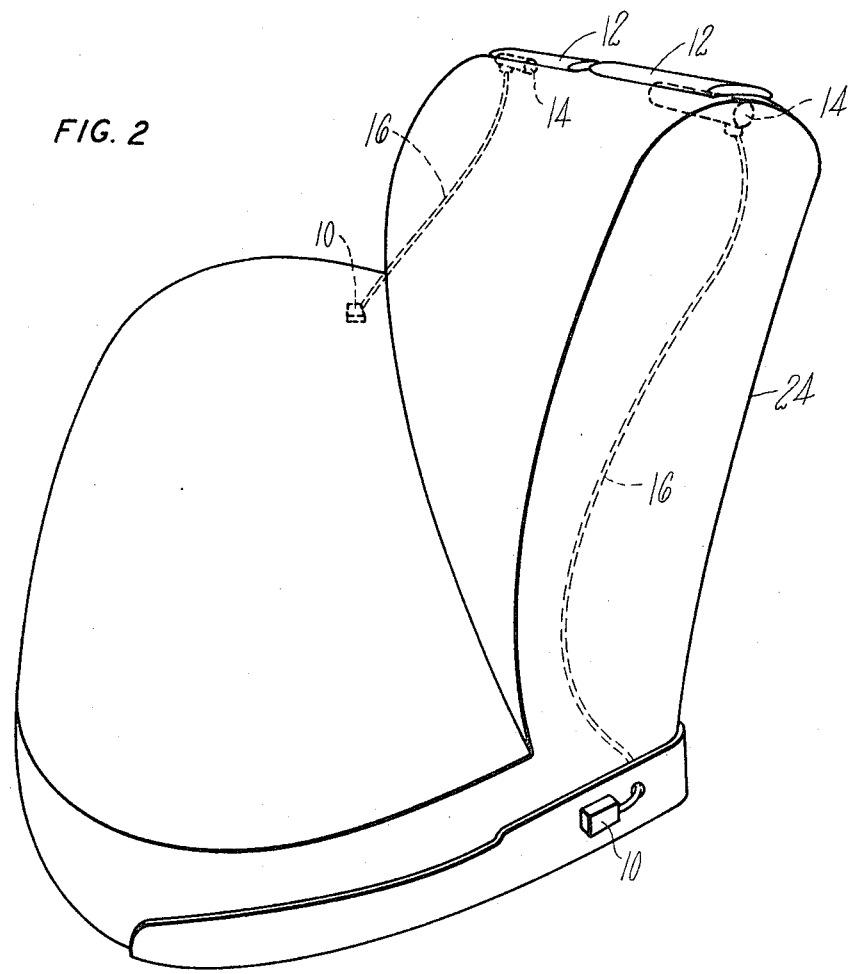
FIG. 2 is a perspective view of an automobile passenger seat incorporating the system of the present invention in an inflatable headrest shown in its collapsed condition.
Figure 3:
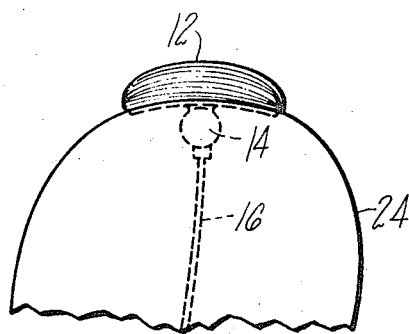
FIG. 3 is an enlarged fragmentary side view of the seat of FIG. 2.

As shown in FIGS. 1 and 2 the crash bag 12 is preferably folded accordian-style for storage. Where complete concealment is desired a suitable storage cavity such as compartment 26 may be provided as in the dashboard 20 of the automobile. A covering 28 which can be readily opened or ruptured to release the crash bag with little or no resistance to its deployment is used to cover the storage cavity and concealably enclose the bag. Similar enclosing arrangements may be provided at other locations or a portion of the bag itself may form its own cover as best illustrated in FIG. 3.

As mentioned, the inertia or acceleration sensing devices 10 are mounted in selected locations near the passenger compartment for detecting an appropriate collision condition. The sensors 10 are capable of immediate response to this condition and will initiate an energy signal for transmission through lines 16 to the gas generator assemblies 14 for effecting deployment of the passenger confinements 12. Although only a single sensing device 10 is illustrated as being associated with one or more inflatable crash bags 12, it will be appreciated that a plurality of sensors responsive to different directional forces could be operatively connected to a single crash bag. Additionally, sensors of varying impact force levels may be advantageously connected to a common signal transmission line as backup devices for the primary sensing device.

Generally the sensor should not respond to a force below a specified value yet be consistently and reliably responsive to forces at or above a selected level, the closeness of these values indicating the sensitivity of the device. In the preferred embodiment the sensor has a high sensitivity, that is, a short range between a no-fire condition and an all-fire condition. An inertia device found particularly effective in this regard is the trigger mechanism disclosed in the copending U.S. Pat. application of William M. Smith and Francis N. Wroble, Ser. No. 6,162 filed Jan. 27, 1970, now U.S. Pat. No. 3,601,081 assigned to the same assignee as this application. The trigger mechanism described in that application exhibits a no-fire force level of 4 g and a reliable all-fire force level of 6 g.

Operation of the sensing device 10 in response to a collision condition will initiate the transmission of an energy signal through the transmission line 16 for activating the pyrotechnic gas generator. For this purpose the impact sensor 10 is generally a directionally responsive device having a housing 32 secured to the vehicle for movement therewith. The housing mounts a cocked firing pin 34 adapted for slidable movement under the momentum imparted thereto in response to the collision condition. In the system of the present invention, the firing pin 34 is positioned in operative relationship with a stab detonator or similar percussion member for initiating an explosive energy signal for transmission along the line 16 to the pyrotechnic gas generator. In the arrangement illustrated in FIG. 6 a stab detonator 36 is shown positioned for actuation by the firing pin 34. The detonator 36 includes a metal shell 38 having a thin rupturable wall portion 40 at one end and an aperture 42 at the opposite end for receiving the transmission line 16. The shell 38 encloses a priming charge 46 adjacent the wall portion 40, an intermediate explosive charge 48, such as lead azide, and an explosive main charge 50 containing a high explosive, such as RDX nearest the aperture 42. A thin fibrous sheet 52 encloses the interior of aperture 42 in protective intimate engagement with the main charge 50 and as shown, one end of the signal transmission line 16 abuts the sheet 52 at the aperture 42.

The signal transmission line 16 preferably takes the form of a flexible detonating cord comprising a central core 56 of high explosives encased within a suitable covering 58 capable of confining the products of detonation so they neither damage adjacent equipment nor contaminate the environment through which they are routed. The explosive core 56 is comprised of PETN, RDX or similar high explosives at core loads of about 1 to 5 grains per foot and the cord exhibits a velocity of detonation in the range of 5,000 to 8,000 meters per second. The outer covering generally consists of successive layers of plastic and braid; however, to provide the desired confining characteristics it is necessary that the covering exhibit good strength characteristics. Accordingly, about 10 to 16 layers of fiberglass braid are employed over one or more continuous plastic jackets to give both strength and flexibility. Typical of the explosive signal transmission lines that may be employed in the system of the present invention are the nonmetallic confined detonating cord sold by The Ensign-Bickford Company under the names "Primaline" and "Hi Flex." These provide safe and reliable energy transfer in a highly efficient manner.

Use of such explosive energy transmission lines clearly provides signal transmission from the sensor to the pyrotechnic gas generator in substantially less than one millisecond. However, to render the signal capable of igniting the gas generator there also is provided a suitable initiator 60 containing a suitable igniter charge 62 such as a mixture of titanium, aluminum and red lead.

Figure 4:
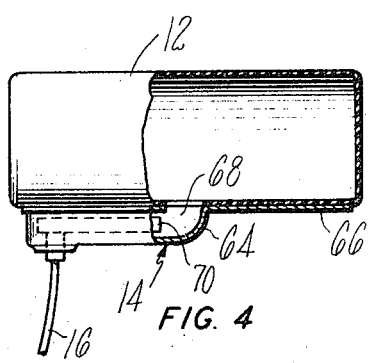
FIG. 4 is an elevational view of one of the headrests of FIG. 2 in its inflated condition, the headrest being partially broken away and partially in section.

As shown in FIG. 4, the gas generating assembly of the present invention comprises a housing 64 including a supporting flange portion 66 defining a gas outlet port 68 communicating with the interior of the crash bag 12 for supplying gas thereto. The gas generator 70 is mounted within the housing 64 for operation in response to the signal trans-mission detonating cord 16 and preferably comprises a plurality of solid, particulate, pyrotechnic gas-generating charges responsive to the initiator 60 for rapidly producing large volumes of gas for delivery to the interior of the inflatable crash bags through the port 68. The gas generators are preferably located adjacent the gas bag and communicate therewith through one or more gas outlet ports within the housing. The pyrotechnic gas generator 70 may take a variety of forms so long as it is capable of producing a sufficient quantity of gas to deploy and fully inflate the safety crash bag 12 and provide an internal pressure within the range of about 5 to 20 psi. A more detailed description of gas generators which may be employed in accordance with the teaching of the present invention are disclosed in the copending United States patent application of William M. Smith and Francis N. Wroble, Ser. No. 6163 filed Jan. 27, 1970, assigned to the same assignee as this application.

Thus, from the foregoing detailed description it is readily apparent that the system of the present invention is completely self-contained and independent of all other systems of the automobile including the electrical system thereof. In this way, it is not dependent upon the operative condition of those systems and is constantly in a condition of readiness.

Referring now specifically to FIGS. 7 and 8, there is illustrated a modification of the system of the present invention wherein the gas generator assembly 14 is a multistage unit mounted on the interior of the inflatable passenger restraining member 12. In this embodiment the assembly 14 includes a pair of flat generally rectangular mounting and sealing plates 72, 74 secured in parallel overlying relationship for sealably clamping a wall portion 76 of inflatable member 12 therebetween. A passage 78 extends through the laminar plate construction and mountably receives a block-like ignition post 80 of the pyrotechnic gas generator. The post 80 is provided with an ignition inlet cavity 84 adapted to receive an initiator, such as the device 60, for firing the gas generator.

As shown, the generator consists of a pair of elongated, generally parallel first and second gas-generating stages 86, 88 supportably mounted on the ignition block 80 and firmly secured thereto by a tie rod 90 extending longitudinally between the stages 86, 88. The ignition block is provided with a pair of side apertures 92, 94 communicating with the first and second stages respectively of the gas generator and with the ignition cavity 84. Each stage of the gas generator is substantially identical and consists of a pair of concentrically mounted perforated tubes 96, 98 except that the second stage 88 is additionally provided with a short length of delay line 100 positioned within the end of tube 96 at aperture 94 for operatively separating the second stage 88 from ignition cavity 84. The internal tubes 96 of the respective stages are received within the apertures 92, 94 and enclose therein a rod-like charge 102 of primary gas-generating pyrotechnic material, such as black powder or the like. The secondary pyrotechnic gas-generating charge 104 of each stage is confined within the space provided between the concentric tubes 96, 98 and exhibits a tubular form. The tubes 96 are provided with large numbers of peripheral ports 106 disposed along their lengths to provide communication between the concentrically arranged primary and secondary charges 102, 104. As discussed in greater detail in the aforementioned Smith and Wroble patent application relating to pyrotechnic gas generators, the secondary gas-generating charge 104 preferably is a pyrotechnic material such as ammonium nitrate or a mixture thereof and has the effect of cooling the gas produced by the primary charge.

The gas resulting from both charges of each stage will be diffusably delivered to the interior of the inflatable bag 12 through a plurality of gas outlet ports 110 spaced along the periphery of the tubes 98. In accordance with the embodiment chosen for illustrative purposes, the first stage 86 of the gas generator is the innermost or top stage and will provide an initial deployment thrust on the deflated crash bag at a time prior to ignition of the second stage 88. The delay column 100 and the primary charge of the first stage 86 are ignited substantially simultaneously so that the delay period of a few milliseconds provided by delay line 100 facilitates a more controlled delivery of the gas to the crash bag 12 without disadvantageously delaying the deployment of the bag. In fact, both stages of the gas generator will be fully operative within less than 10 milliseconds of initiation by the initiator 60 and the entire system will be fully deployed within a total lapsed time of about 25 milliseconds.

As will be apparent to persons skilled in the art, various modifications, adaptations and variations of the foregoing specific disclosure can be made without departing from the teachings of the present invention.

I claim:

1. A vehicle safety system for restraining movement of an occupant upon the occurrence of a collision condition, said system being self-contained, independent of the electrical system of the vehicle and comprising an occupant restraining member movable between a collapsed inoperative position and a deployed position; deployment means operatively associated with the occupant restraining member for moving said member out of its collapsed inoperative position toward its deployed position, said deployment means comprising a pyrotechnic gas generator containing a gas-generating charge of compact granular pyrotechnic material selected from the group consisting of black powder and ammonium nitrate; inertia sensing means responsive to a rapid deceleration force above a predetermined value; and an explosive signal transmission line operatively connecting the inertia sensing means and the deployment means and being substantially instantaneously responsive to the inertia sensing means for activating the deployment mean and causing deployment of the restraining member.

2. The system of claim 1 wherein the explosive signal transmission line comprises an elongated explosive cord including a confining structure of sufficient strength to fully contain the detonation products of the explosive.

3. The system of claim 1 wherein the occupant restraining member is an inflatable crash bag and the pyrotechnic charge is responsive to an energy signal initiated by the inertia sensing means for transmission along the explosive signal transmission line for igniting the pyrotechnic charge and rapidly supplying gas to the inflatable bag.

4. The system of claim 1 wherein the signal transmission means comprises a percussion detonator, an elongated detonating cord operatively associated with the detonator for actuation thereby and a pyrotechnic igniter operable in response to an explosive energy signal received from the detonating cord.

5. In an inflatable passenger restraining system for vehicles comprising an inflatable confinement, a gas delivery assembly for delivering gas to the confinement and effecting inflation thereof, an impact sensor and a signal transmission line operatively connecting the impact sensor and the gas delivery assembly, the combination wherein the gas delivery assembly includes a pyrotechnic gas generator having a plurality of compact gas-generating charges comprised of solid granular pyrotechnic material, at least two of the gas-generating charges being elongated columns extending in parallel spaced relationship within the generator, at least one of said gas-generating charges being a generally cylindrical pyrotechnic charge, the gas generator including still another gas-generating pyrotechnic charge disposed in concentric relationship to said cylindrical charge.

6. The system of claim 5 wherein at least two of the gas-generating charges are elongated columns extending in parallel spaced relationship within the generator.

7. The system of claim 5 wherein the signal transmission line includes a confined column of high explosive material having a velocity of detonation of about 5,000 to 8,000 meters per second.

8. The system of claim 5 wherein the gas generator is located exteriorly of the inflatable confinement and in fluid flow communication with the interior thereof.

9. The system of claim 5 wherein the inflatable confinement is provided with a gas inlet port and the gas generator is positioned adjacent said inlet port for rapidly delivering gas thereto, the compact gas-generating charges being present in an amount sufficient to fully inflate the confinement and provide an internal pressure of at least about 5 to 20 psi.

10. The system of claim 5 wherein the gas generator is a multistage unit and the stages are adapted for sequential ignition.

11. The system of claim 5 wherein the impact sensor is a directionally responsive device having a firing pin; the signal transmission line comprises a detonator operable in response to impact by said firing pin, a detonating cord positioned for actuation by said detonator and a pyrotechnic initiator operable in response to an energy signal received from the detonating cord.

* * * * *